(12) United States Patent
Quehenberger et al.

(10) Patent No.: US 9,022,192 B2
(45) Date of Patent: May 5, 2015

(54) COUPLING ASSEMBLY

(75) Inventors: Johannes Quehenberger, Saalbach (AT); Alexander Fürschuss, Graz (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 382 days.

(21) Appl. No.: 13/578,663

(22) PCT Filed: Feb. 14, 2011

(86) PCT No.: PCT/EP2011/052122
§ 371 (c)(1),
(2), (4) Date: Sep. 27, 2012

(87) PCT Pub. No.: WO2011/098595
PCT Pub. Date: Aug. 18, 2011

(65) Prior Publication Data
US 2013/0199885 A1 Aug. 8, 2013

(30) Foreign Application Priority Data

Feb. 12, 2010 (DE) .......................... 10 2010 007 742
Aug. 24, 2010 (DE) .......................... 10 2010 035 180
Feb. 14, 2011 (WO) ................. PCT/EP2011/052122

(51) Int. Cl.
*F16D 23/12* (2006.01)
*F16D 13/04* (2006.01)
*F16D 23/06* (2006.01)
*F16D 27/10* (2006.01)

(52) U.S. Cl.
CPC ................ *F16D 23/12* (2013.01); *F16D 13/04* (2013.01); *F16D 23/06* (2013.01); *F16D 27/10* (2013.01); *F16D 2023/0687* (2013.01); *F16D 2023/123* (2013.01)

(58) Field of Classification Search
CPC ......... F16D 13/04; F16D 23/06; F16D 23/12; F16D 2023/123; F16D 2023/0687; F16D 27/10
USPC .............. 192/20, 24, 84.1, 84.92, 85.18, 108
See application file for complete search history.

(56) References Cited

U.S. PATENT DOCUMENTS

| 2,642,970 | A | * | 6/1953 | Szekely ........................... 192/24 |
| 4,244,455 | A | * | 1/1981 | Loker .............................. 192/24 |
| 5,975,263 | A | | 11/1999 | Forsyth |
| 8,689,656 | B2 | * | 4/2014 | Richter et al. ............. 192/53.33 |
| 2003/0142449 | A1 | | 7/2003 | Iwata et al. |
| 2008/0271554 | A1 | | 11/2008 | Mohr et al. |
| 2013/0112522 | A1 | * | 5/2013 | Granzow et al. ............. 192/69.9 |
| 2013/0334001 | A1 | * | 12/2013 | Albrecht et al. ............. 192/69.7 |

FOREIGN PATENT DOCUMENTS

CN 1936356 A 3/2007
DE 19851738 A1 5/2000
(Continued)

*Primary Examiner* — Jacob S Scott
(74) *Attorney, Agent, or Firm* — Jordan IP Law, LLC; Todd A. Vaughn

(57) ABSTRACT

A coupling arrangement for a drive train of a motor vehicle includes at least one clutch arranged on a rotating shaft in order to couple the rotating shaft selectively with a drive element of the drive train, and at least one activation device to activate the clutch. The activation device is adapted to bring an engagement segment selectively into engagement with a threaded segment rotating with the shaft in order to cause a relative movement of the engagement segment and the threaded segment along the axis of the rotating shaft and thus activate the clutch in the axial direction.

19 Claims, 8 Drawing Sheets

(56) References Cited

FOREIGN PATENT DOCUMENTS

| JP | S63115960 A | 5/1988 |
| JP | H03-172625 A | 7/1991 |
| JP | H07-293602 A | 7/1995 |
| JP | H11-002322 A | 1/1999 |
| JP | 2005-506500 A | 3/2005 |
| JP | 2005-249188 A | 9/2005 |
| WO | 2008115370 A1 | 9/2008 |

* cited by examiner

COUPLING ASSEMBLY

CROSS-REFERENCE TO RELATED APPLICATIONS

The present application is a National Stage Application of PCT International Application No. PCT/EP2011/052122 (filed on Feb. 14, 2011), under 35 U.S.C. §371, which claims priority to German Patent Application Nos. 10 2010 007 742.9 (filed on Feb. 12, 2010) and 10 2010 035 180.6 (filed on Aug. 24, 2010), which are each hereby incorporated by reference in their respective entireties.

FIELD OF THE INVENTION

The invention concerns a coupling arrangement for a drive train of a motor vehicle with at least one clutch arranged on a rotating shaft to couple the rotating shaft selectively with a drive element of the drive train, and with at least one activation device to activate the clutch.

BACKGROUND OF THE INVENTION

Such devices can be used in particular in the form of so-called disconnect systems to decouple parts of the drive train in a motor vehicle with switchable all-wheel drive, so that on two-wheel drive the connection between the primary axle or the drive unit firstly and the secondary axle secondly can be interrupted at least partially. Alternatively coupling arrangements of said type can also be used in a vehicle with hybrid drive to separate the main gearbox from the combustion engine during electric operating mode in order to prevent power losses and minimize noise. Also a drive train decoupling can be provided for an electric drive on the secondary axle.

DE 40 02 053 A1 discloses a coupling system of the type cited initially in which one axle shaft can be decoupled selectively from a differential gear by means of an axially displaceable selector sleeve. In idle mode, power losses caused by trailing drive of differential gear components can thus be reduced.

SUMMARY OF THE INVENTION

The object of the invention is to create a simple and economic possibility of activating the clutch of the coupling arrangement of said type.

This object is achieved by a coupling arrangement for a drive train of a motor vehicle with at least one clutch arranged on a rotating shaft in order to couple the rotating shaft selectively with a drive element of the drive train, and with at least one activation device to activate the clutch, wherein the activation device is adapted to bring an engagement segment selectively into engagement with a threaded segment rotating with the shaft in order to cause a relative movement of the engagement segment and the threaded segment along the axis of the rotating shaft and thus activate the clutch in the axial direction.

In accordance with the invention the activation device is adapted to bring an engagement segment selectively into engagement with a threaded segment rotating with the shaft in order to cause a relative movement of the engagement segment and the threaded segment along the axis of the rotating shaft and thus activate the clutch in the axial direction. The engagement segment and threaded segment thus form a conversion device to convert the rotary motion of the shaft into an axial motion. The energy for the axial activating movement is thus generated directly by the rotating shaft, whereby the construction of the system can be made particularly simple. In particular the activation device need not necessarily be fitted with a drive to provide a sufficiently high axial force for clutch engagement. An actuator to be provided need merely be able to bring the engagement segment into or out of engagement with the threaded segment of the rotating shaft. This can e.g. take place in the radial direction.

In the context of the present invention, a threaded segment generally means a device which, on a relative twist of two components, causes a relative axial movement of the two components. In particular such a threaded segment can be a screw thread or a helically running groove which forms a sliding block guide.

The directional terms "axial" and "radial" in the context of the present invention always relate to the axis of the rotating shaft.

In general the torque transmission can take place from the rotating shaft as the input element to said drive element of the drive train as the output element or in the opposite direction.

The engagement segment can be formed by a segment of the activation device, for example, by a segment of an axially displaceable actuator element or by a segment of a radially mobile tappet. The activation device thus acts via the engagement segment on the rotating threaded segment in order to convert the rotary motion of the shaft into an axial motion to activate the clutch. The movement direction of the actuator element can generally be parallel, perpendicular or inclined (at any angle) to the axis of the rotating shaft. The actuator element can be designed to be rotatable or displaceable.

The threaded segment can be formed by a segment of the rotating shaft itself or by a portion of a sleeve connected rotationally stationary with the rotating shaft. The only important factor is that the threaded segment rotates together with the shaft in order to allow a transfer of rotary motion and conversion into an axial motion.

In particular the engagement segment can be mobile in the radial direction in relation to the axis of the rotating shaft. By the cooperation of the engagement segment and the threaded segment, a radial actuating motion is thus converted into an axial activating motion.

The activation device can comprise an actuator to move the engagement segment relative to the threaded segment and thus selectively bring the engagement segment into engagement with the threaded segment. The actuator can comprise an electrically controllable linear drive device, in particular a lifting magnet or a linear motor. Such linear drive devices are relatively economic. Use of a lifting magnet eliminates the need for a complex motor controller such as would be necessary for example to drive an electric motor. Alternatively the actuator can be driven for example by a hydraulic or pneumatic pressure source.

The drive element of the drive train to be coupled can be a further shaft or gear element. For example on activation of the clutch, a form-fit connection can be provided between firstly the rotating shaft and secondly an input shaft, output shaft, housing or crown wheel of a differential gear, or a gear wheel of an angle gear.

In accordance with an embodiment of the invention, the threaded segment comprises two individual portions with opposing thread turn directions, i.e., two individual portions with opposite thread. The threaded segment can thus comprise both a right-hand thread and a left-hand thread which are arranged next to each other or separated from each other. In this way it is possible by means of the threaded segment, while retaining the direction of rotation of the rotating shaft, to achieve selectively either an opening or a closing of the clutch in that namely the engagement segment is brought into engagement with the right-hand thread or left-hand thread depending on the desired activation direction. A separate engagement segment and/or a separate actuator can be provided for each individual portion of the threaded segment.

In accordance with a further embodiment, the activation device comprises an actuator element with a carrier on which is formed the engagement segment, wherein the threaded segment is formed on the rotating shaft, and to activate the clutch, the actuator element is displaceable along the axis of the rotating shaft. For example, a thread can be provided on the carrier as an engagement segment.

In accordance with embodiments, the actuator device can further comprise an actuator to move the carrier relative to the threaded segment of the rotating shaft and thus bring the carrier selectively into engagement with the threaded segment of the rotating shaft. Such an actuator can be provided particularly economically as this need merely overcome the relatively low travel to bring the two threaded segments into engagement. The carrier and preferably the entire actuator element is held rotationally stationary. As soon as the carrier is in engagement with the threaded segment, the rotation movement of the shaft ensures that the carrier is driven and hence the actuator element displaced axially.

Preferably the actuator is formed to move the carrier selectively in the radial direction in relation to the axis of the rotating shaft. The radial movement can also be overlaid with an axial movement component. The movement which moves the carrier into engagement with the threaded segment of the rotating shaft can thus, for example, also follow a curve. Preferably however the movement of the actuator is purely linear.

Preferably the engagement segment of the carrier can be brought by the actuator into engagement with the threaded segment along a length of the threaded segment which corresponds to the axial adjustment travel of the actuator element. The entire axial adjustment movement to be carried out is thus provoked by the rotating shaft.

In accordance with a further embodiment, the actuator element cooperates with the threaded segment of the rotating shaft and with an actuator of the activation device such that the engagement segment of the carrier automatically moves out of engagement with the threaded segment on reaching an axial end position of the actuator element. In this way a precise and reliable activation of the clutch is ensured.

The actuator element can be blocked in an axial end position (in particular in said end position) by means of an actuator or the actuator. An undesirable return movement of the actuator element is thus securely prevented.

In accordance with an embodiment, the carrier is pretensioned by means of a spring device radially outwards or radially inwards in relation to the axis of the rotating shaft. When pretensioned radially outwards, the carrier is consequently not in engagement with the threaded segment but a corresponding actuator ensures an engagement movement against the pretension. When pretensioned radially inwards, an actuator can be provided which causes a movement against the pretension to disengage the carrier and threaded segment. By the provision of a spring device, the overall construction of the arrangement can be simplified as only one actuator acting in one direction is required.

In accordance with a further embodiment, the actuator element is pretensioned by means of a spring device in the axial direction in relation to the axis of the rotating shaft, in particular in a direction facing away from the clutch. The construction of the coupling arrangement can thus be further simplified since for example no separate actuator is required to return the actuator element.

To allow an axial force transmission from the carrier to the further components of the actuator element and at the same time allow a radial movement of the carrier relative to the threaded segment, the carrier can be provided on a lever which is mounted pivotably on a preferably exclusively axially displaceable component of the actuator element. The exclusively axially displaceable component can for example be a selector fork or a selector sleeve arranged coaxial to the rotating shaft.

The threaded segment of the rotating shaft is preferably formed as an external thread, while the carrier comprises an allocated internal thread (in particular an angle segment of an internal thread). Alternatively, however, it is also possible that said threaded segment forms an internal thread while the carrier comprises an allocated external thread. In accordance with a further alternative, the threaded segment of the rotating shaft can be formed in the manner of a spiral plate, i.e., the threaded segment forms a spiral sliding block guide which extends within a plane normal to an axis of the rotating shaft and in which the carrier engages selectively in the axial direction. In this case preferably a deflection device is provided to convert a radial adjustment movement of the carrier into an axial adjustment movement of the actuator element.

It is furthermore preferred if the threaded segment of the rotating shaft comprises a circumferentially running thread with several thread turns or is formed by a helically running groove. A multiturn thread allows a large adjustment travel with secure force transmission between the rotating shaft and carrier. It also guarantees that even at high rotational speeds of the rotating shaft, the axial adjustment speed of the actuator element will not be too high, ensuring a reliable activation of the clutch and preventing damage to the clutch. Formation of the threaded segment as a helically running groove is suitable in particular for low rotational speeds of the rotating shaft.

The threaded segment extends preferably coaxial to the axis of the rotating shaft. Furthermore, it is preferred if the threaded segment extends along a cylinder casing oriented coaxially to the axis of the rotating shaft. Alternatively it is also possible for example that said threaded segment extends along a cone casing.

The carrier can comprise a nut angle segment, i.e., an angle segment of an element with internal thread. The nut angle segment is a simple component with relatively small dimensions which can be produced easily and economically.

In accordance with a further embodiment, the actuator element comprises a sleeve. For example, the actuator element can comprise an axially displaceable selector sleeve or selector fork which cooperates in the known manner with a selector sleeve to connect two toothing segments. The clutch can also comprise a claw-type clutch wherein the actuator element cooperates with a clutch element or with a synchronizing device of the claw-type clutch. Blocking of the synchronization can be provided by suitable measures known in principle, for example in the form of synchronizer rings fitted with blocking toothing.

In accordance with a further embodiment of the invention, the threaded segment is formed by a segment of a sleeve connected rotationally fixed with the rotating shaft and axially displaceable, in order thus to create a form-fit connection between the shaft and the drive element of the drive train. The sleeve can for example have an internal profiling which cooperates in the manner of engagement toothing with a corresponding external profiling on the drive element. In this way high and alternating torques can be transmitted reliably between the shaft and the drive element. Furthermore, in this embodiment the clutch construction is particularly simple since, where applicable, no selector fork or other transmission components are required.

On the sleeve can be provided an external thread forming the threaded segment which cooperates with an internal thread forming the engagement segment on an axially fixed part of the activation device. By means of the engagement between the axially fixed part of the activation device and the axially displaceable sleeve, because of the rotation movement of the shaft, an axial shift of the sleeve is achieved.

The internal thread can be formed directly on a face of a radially mobile tappet of an actuator so that no further components are required to implement the engagement segment. The internal thread can however also be formed on an autonomous engagement element on which can operate a radially mobile tappet of an actuator. Such an engagement element forms an intermediate piece for force transmission between the actuator and the engagement segment formed as an internal thread.

In accordance with an alternative embodiment the threaded segment can be formed by a helically running groove which is adapted for engagement with an actuator pin forming the engagement segment. The groove cooperates with the actuator pin as a type of sliding block guide, whereby an axially fixed actuator pin causes an axial shift of the sleeve rotating with the shaft in the same way as is the case on cooperation of an internal thread and external thread.

The actuator pin can be formed by a radially mobile tappet of an actuator, which leads to a particularly simple construction.

The groove can have a ramp-like starting segment and/or a ramp-like end segment in order to facilitate tracking of the actuator pin.

In accordance with an advantageous embodiment, the sleeve can be locked in an axial end position, in particular in a closing position which corresponds to a fully engaged clutch, and/or in an opening position which corresponds to a fully released clutch. Accidental release of the clutch is thus effectively prevented.

Refinements of the invention are described in the secondary claims, the description and the enclosed drawings.

DETAILED DESCRIPTION OF EMBODIMENTS

Figure 1:
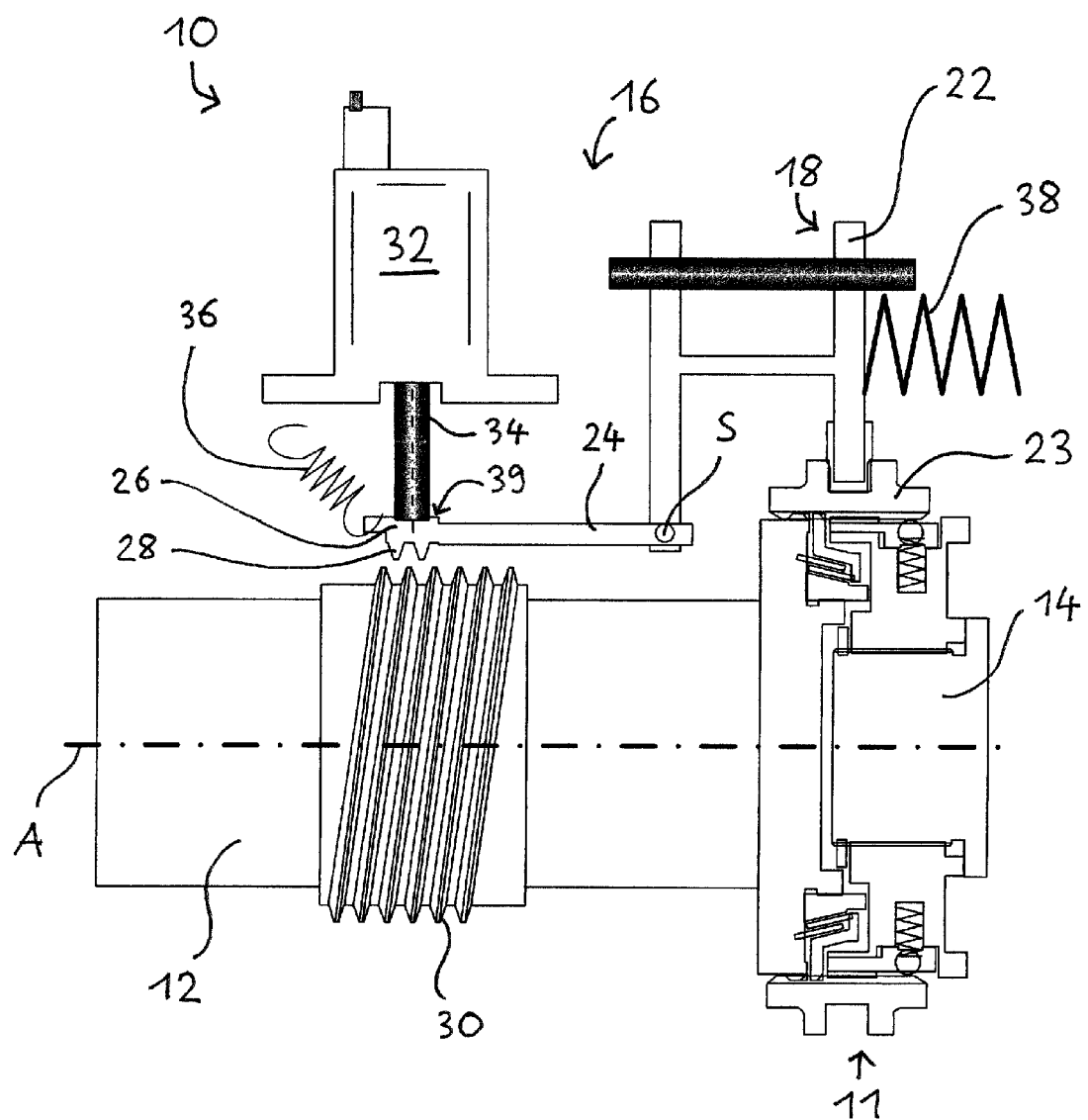
FIG. 1 illustrates a simplified side view of a coupling arrangement in accordance with a first embodiment of the invention, whereby a clutch of the coupling arrangement is not activated.

As illustrated in FIG. 1, a coupling arrangement 10 according to the invention is arranged in a drive train of a motor vehicle not in more detail. A clutch 11 which can for example, be a blocking synchronizer serves for selective coupling of a rotating shaft 12 (for example, an output shaft of the main gearbox, a distributor gearbox or an electric motor of a motor vehicle) and an output shaft 14 (for example, an axle shaft, a cardan shaft or an input element of an angle gear). The configuration illustrated in FIG. 1 corresponds to a fully engaged clutch 11, i.e. a driving, preferably form-fit coupling of the rotating shaft 12 and the output shaft 14, wherein the clutch 11 is pretensioned in the engaged position illustrated in FIG. 1.

Allocated to the clutch 11 is an actuator device 16 which comprises an actuator element 18. A selector fork 22 of the actuator element 18 can be displaced parallel to the rotation axis A of the rotating shaft 12 in order to shift a sleeve 23, and thus, achieve activation of the clutch 11. The selector fork 22 can as illustrated perform a movement in the axial direction or alternatively be mounted rotatably about a point.

A lever 24 is hinged on the selector fork 22 such that it can pivot about a pivot axis S arranged at right angles to the rotation axis A. An end portion of lever 24 is formed as an engagement segment in the form of a nut angle segment 28 which can be brought into engagement with a threaded segment 30 provided on the rotating shaft 12. The nut angle segment 28 on the lever 24 furthermore forms a carrier 26 which, on engagement between threaded segment 30 and nut angle segment 28, is moved in the direction of the rotation axis A because of the rotation movement of the rotating shaft 12. The travel speed of the carrier 26 depends on the pitch and number of turns of the threaded segment 30 and on the rotational speed of the rotating shaft 12.

An actuator 32 of the activation device 16, which is here formed as an electrically controllable lifting magnet with a linearly mobile tappet 34, ensures selective engagement of the carrier 26 with the threaded segment 30.

As illustrated in FIG. 1, the lever 24 is pretensioned by means of a first spring element 36 in a radial direction facing away from the rotating shaft 12 and lies against the tip of the tappet 34 when the clutch 11 is not activated. Furthermore, a second spring element 38 is provided which pretensions the selector fork 22 in the axial direction in a direction facing away from the clutch 11. This pretension direction in the example here corresponds to the engagement direction. The spring element 36 can be arranged so that it also completely takes over the function of the second spring element 38 in that it is arranged at an angle to the rotation axis A. The portion of the spring force in the radial direction is responsible for lifting the lever 24, and the axial portion for moving the selector fork 22.

Figure 2:
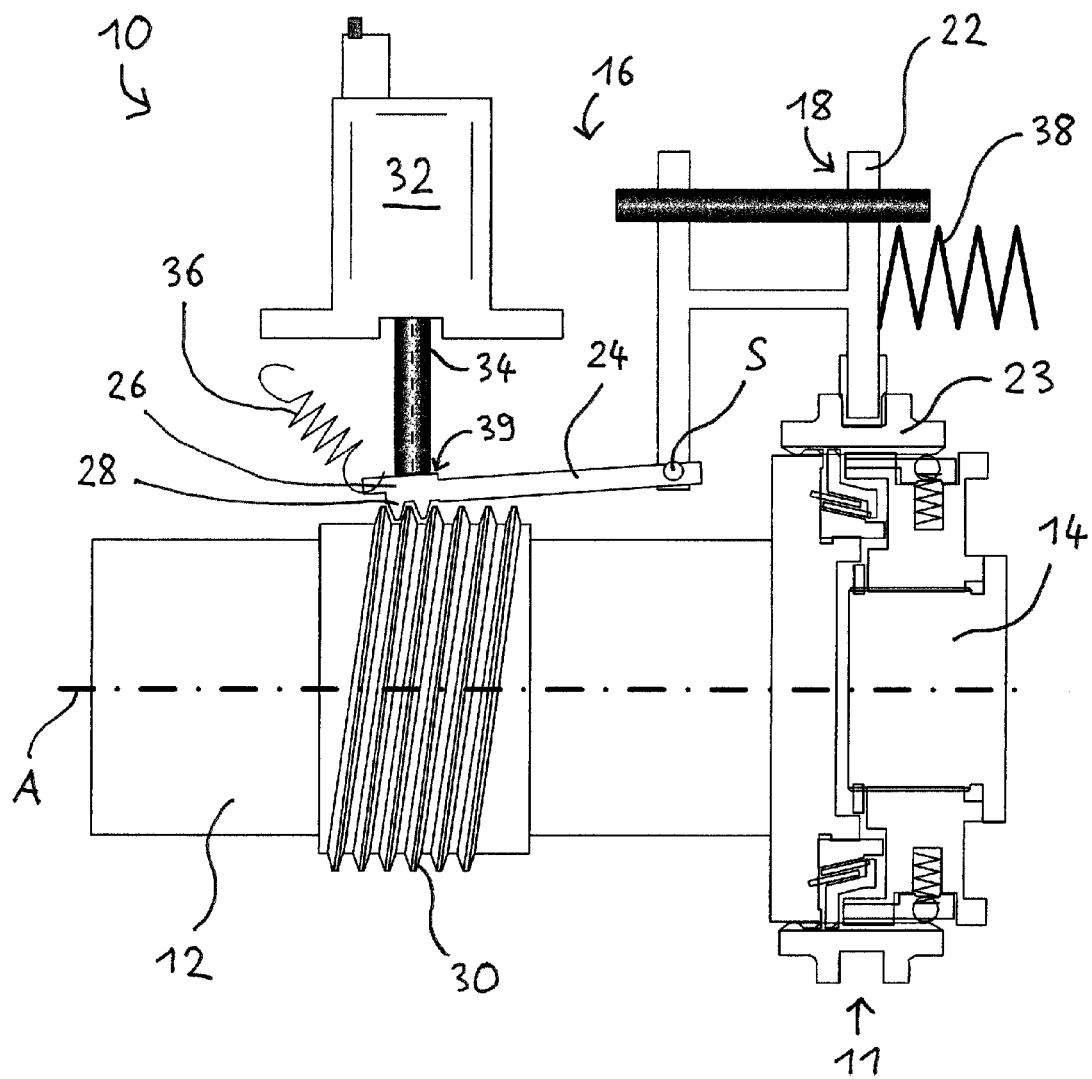
FIG. 2 illustrates the coupling arrangement in accordance with FIG. 1 at the start of clutch activation, whereby an actuator element of the clutch is in a first position.

If, during drive operation, a drive separation of the output shaft 14 from the rotating shaft 12 is to be achieved, by means of a control unit (not illustrated) the lifting magnet 32 is activated, i.e., supplied with power so that its tappet 34 is moved against a pretension (not illustrated) into an extended activation position. This situation is illustrated in FIG. 2. The nut angle segment 28 of the carrier 26 is pressed by the tappet 34 into a meshing engagement with the threaded segment 30 of the rotating shaft 12, causing an axial movement of the carrier 26 and hence the lever 24 in a direction facing towards the clutch 11.

Figure 3:
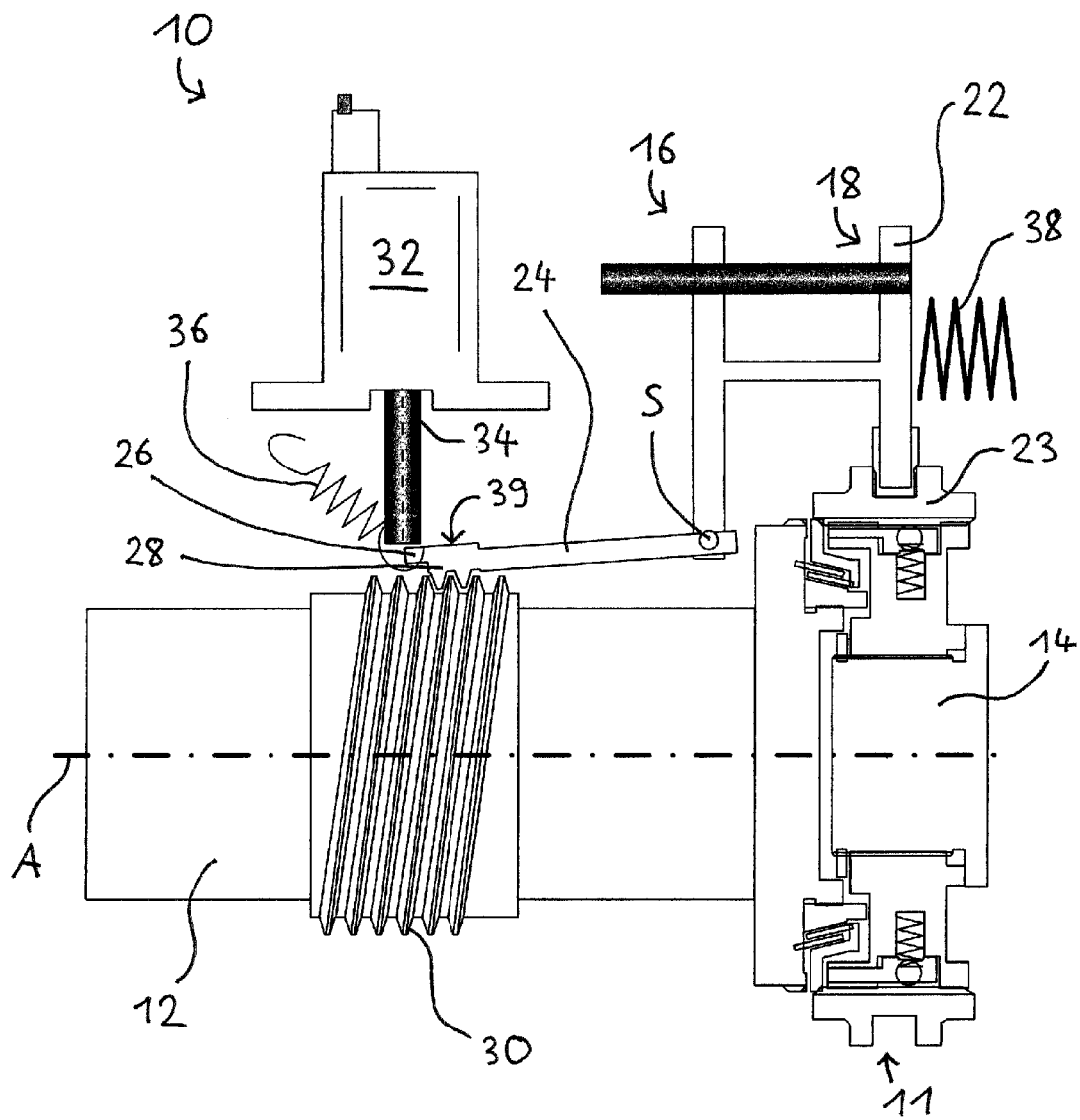
FIG. 3 illustrates the coupling arrangement in accordance with FIG. 1, whereby the actuator element is in a second position.

FIG. 3 illustrates a carrier 26 axially shifted accordingly. During such an axial movement of the carrier 26, the back 39 of the carrier 26 slides along the tip of the tappet 34. The arrangement and dimensions of the lifting magnet 32, threaded segment 30 and carrier 26 are selected such that on reaching an axial end position of the selector fork 22 which corresponds to a fully released state of the clutch 11, the carrier 26 slides past the tappet 34 and is pulled by the first spring element 36 in the radial direction away from the rotating shaft 12 so that the nut angle segment 38 comes out of engagement with the threaded segment 30.

Figure 4:
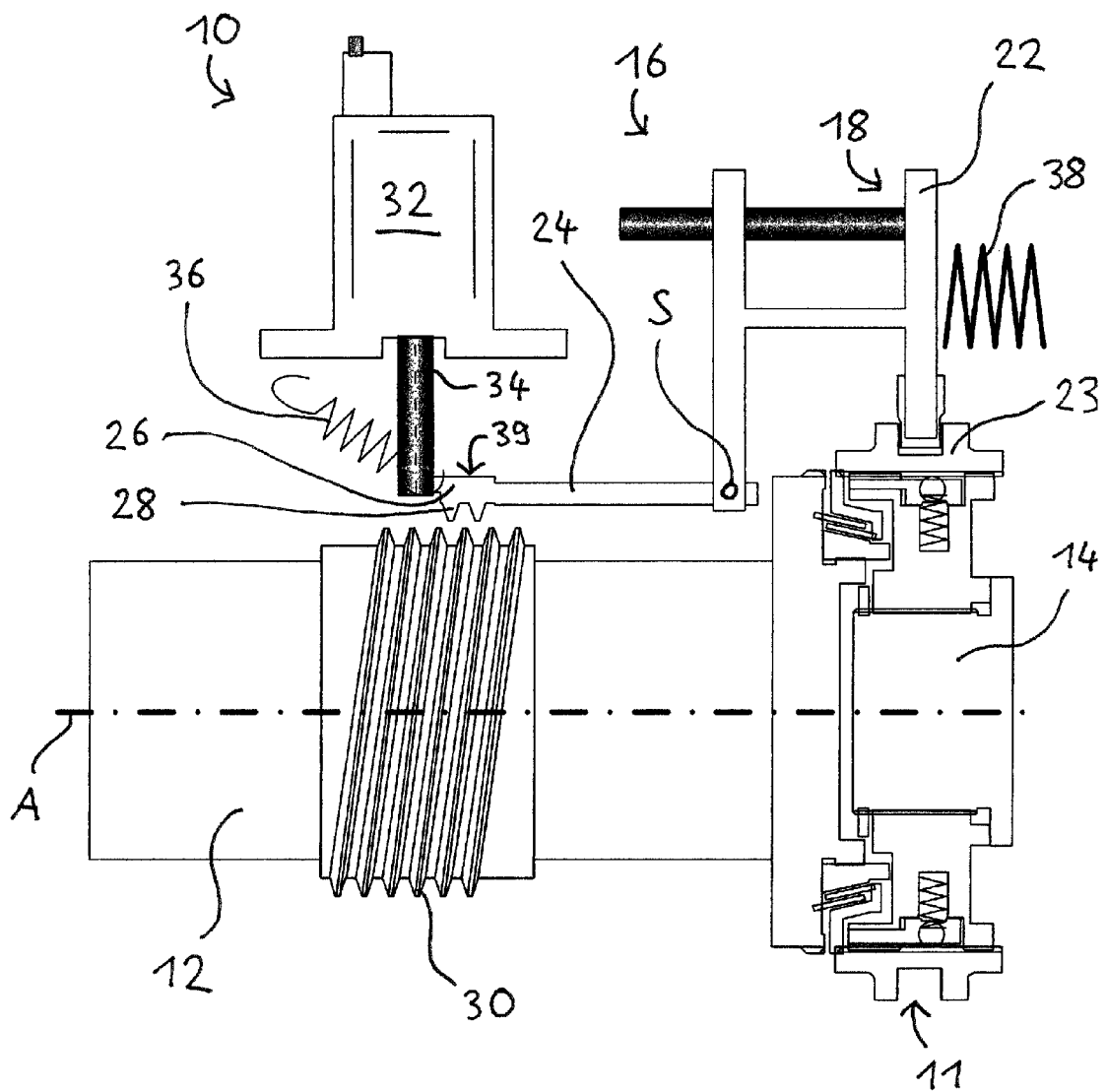
FIG. 4 illustrates the coupling arrangement in accordance with FIG. 1, whereby the actuator element is in a third position and the clutch is fully activated.

This phase of the adjustment movement is illustrated in FIG. 4. The lever 24 engages behind the tappet 34 of the lifting magnet 32, blocking an axial return movement of the selector fork 22. In this position the clutch 11 is opened and the torque transmission between the rotating shaft 12 and the output shaft 14 is interrupted.

As soon as the activation of the lifting magnet 32 is eliminated and the tappet 34 is moved by a spring (not illustrated in FIGS. 1 to 4), back to its retracted starting position as illustrated in FIG. 1, the second spring element 38 presses the selector fork 22 together with the lever 24 back to the starting position in an axial direction facing away from the clutch 11, whereby the carrier 26 always remains out of engagement with the threaded segment 30. A stop can be provided for the lever 24 so that the lever 24 does not follow the movement of the tappet 34. The clutch 11 is closed again during this return movement so that in the starting position illustrated in FIG. 1, once again a drive coupling is created between the rotating shaft 12 and the output shaft 14. The second spring element 38 at the start of the return movement exerts a constant force on the clutch 11, creating a synchronization moment. As soon as the rotation speeds of the rotating shaft 12 and output shaft 14 are balanced, the blocking effect can be overcome and the clutch 11 closed by form fit.

The design of the clutch 11 can be adapted in many ways to the application concerned. Thus in particular a blocking synchronization or a pure claw-type clutch can be used. In the embodiment example illustrated, an electric activation of the lifting magnet 32 ensures activation of the clutch 11 in the sense of separation of the rotating shaft 12 and output shaft 14. The clutch 11 is closed accordingly by elimination of the activation of the lifting magnet 32.

Alternatively, the reverse procedure is possible, i.e., a lifting magnet can be used in which, by corresponding pretensioning of the tappet in the deactivated state of the lifting magnet 32, the carrier 26 is pressed onto the threaded segment 30 or blocked in the axial end position (FIG. 4) to open the clutch 11 while the tappet 34, on activation of the lifting magnet 32, releases the lever 24 and hence the actuator element 18 for movement along axis A in order to close the clutch 11. The coupling arrangement 10 illustrated in FIGS. 1 to 4 is configured such that the clutch 11 is opened by axial shift of the carrier 26 in a direction facing towards the clutch 11.

Alternatively, it is also possible to close the clutch 11 by axial shift of the carrier 26 in a direction facing towards the clutch 11. In such a configuration an additional spring element could also be used to prevent damage to the system components in the case of a "tooth on tooth" position. In particular the desired behavior in the case of a fault can be decisive for the configuration of the coupling arrangement 10.

In accordance with a further derivation of the embodiment example described hereinabove, instead of a selector fork 22, for example, a selector sleeve can be provided which is arranged coaxially to the axis A and axially displaceable. Thus, no guide rod is required for a selector fork.

Figure 5:
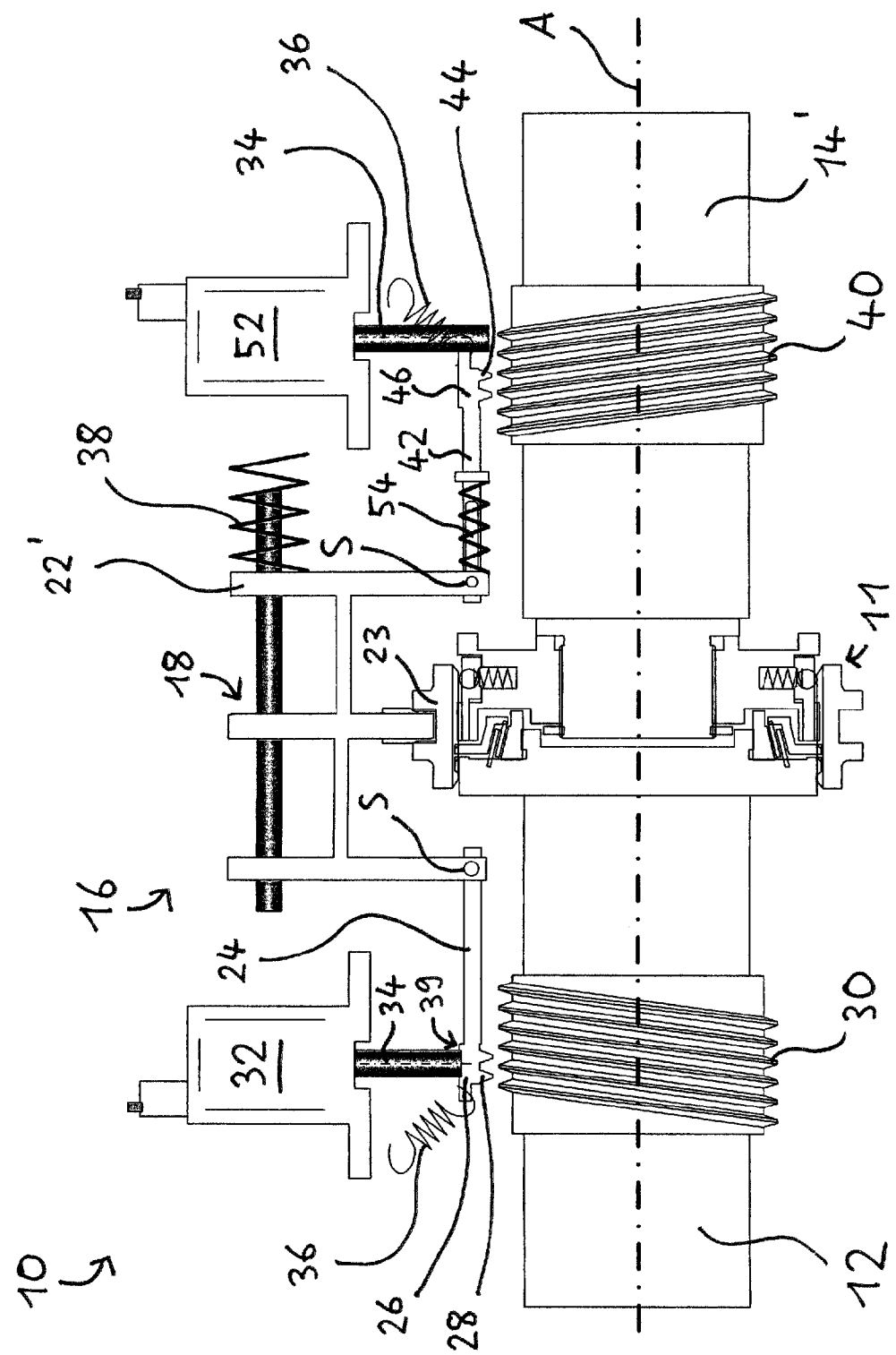
FIG. 5 illustrates a coupling device in accordance with a second embodiment of the invention which includes a clutch with a first and a second actuator, whereby the clutch is not activated.
Figure 6:
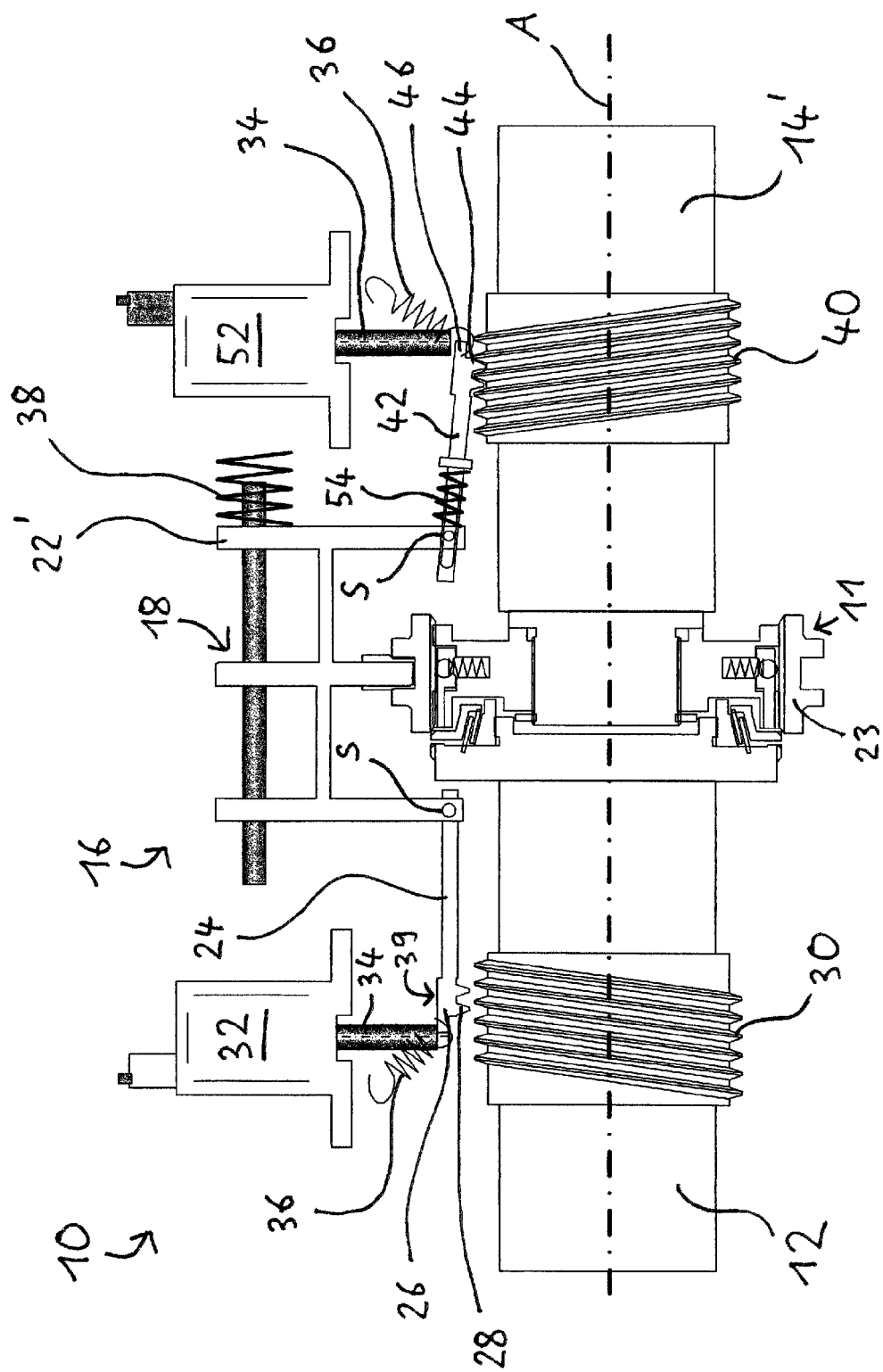
FIG. 6 illustrates the coupling arrangement in accordance with FIG. 5 during a return movement.

FIGS. 5 and 6 illustrate a second embodiment of the invention. In FIG. 5, the clutch 11 is not activated. In FIG. 6, the coupling arrangement 10 is illustrated during an actively supported return movement. In this embodiment the output shaft 14' is fitted with an additional threaded segment 40 which is formed running in the opposite direction to the threaded segment 30, wherein the output shaft 14' rotates in the same direction as the shaft 12. Also an additional lever 42 as carrier 46 is hinged on the selector fork 22' with a nut angle segment 44, namely, at a position axially opposite the first lever 24. An additional lifting magnet 52 serves to bring the carrier 46 selectively into engagement with the threaded segment 40 of the output shaft 14'. By activating the lifting magnet 52, the clutch 11 can thus be returned (after prior activation of the clutch 11 by activation of the lifting magnet 32) actively in the direction of the starting position illustrated in FIG. 5, or such a return movement is actively supported as illustrated in FIG. 6.

As in the embodiment example illustrated in FIGS. 1 to 4, the second spring element 38 also provides a return force when the clutch 11 is activated. The additional lever 42 is furthermore axially displaceable in relation to the selector fork 22', wherein a third spring element 54 pretensions the additional lever 42 away from the selector fork 22', and thus, provides an additional return force. As a result the actuator element 18 can be moved axially starting from the initial position illustrated in FIG. 5, even if the additional lever 42 lies against the extended tappet 34 of the additional lifting magnet 52.

As described hereinabove, the return movement caused by the springs 38 is actively supported by the cooperation of the additional lifting magnet 52 with the nut angle segment 44 and the lever 42. In principle, however, it is also possible to cause the return movement actively, without spring pretension, exclusively by an additional arrangement of threaded segment and carrier.

The second threaded segment 40 illustrated in FIGS. 5 and 6 could in principle also be arranged on the rotating shaft 12, i.e., also on the left side illustrated in FIGS. 5 and 6.

Figure 7:
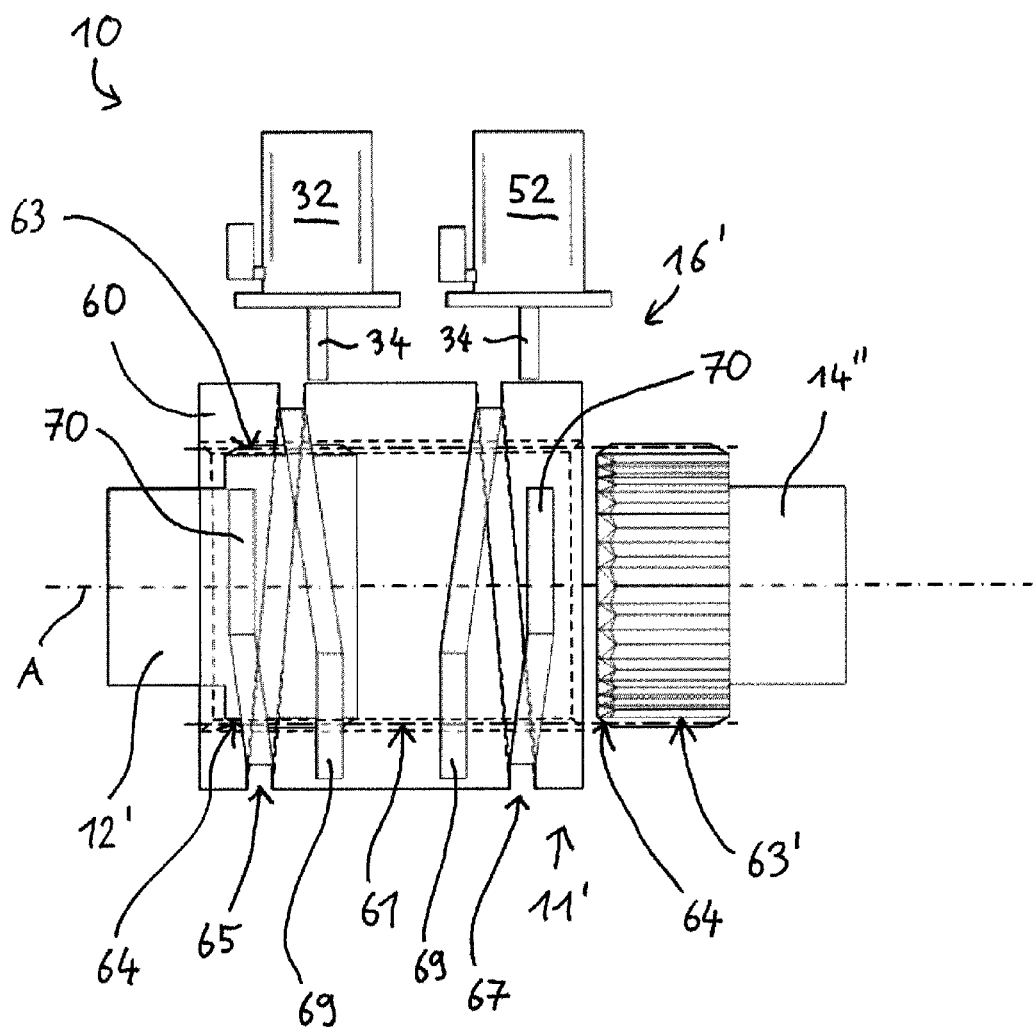
FIG. 7 illustrates a simplified side view of a coupling arrangement in accordance with a third embodiment of the invention.

With reference to FIG. 7, now a third embodiment of the invention is described. In this embodiment the clutch 11' comprises a sliding sleeve 60 connected rotationally fixed to the rotating shaft 12' but axially displaceable on the shaft 12'. The sliding sleeve 60 has an inner profiling or inner toothing 61 which is in engagement with a corresponding outer profiling 63 of the rotating shaft 12' and can be brought selectively into engagement also with a corresponding outer profiling 63' of the output shaft 14" in order to connect together the two shafts 12', 14" by form fit in a closed position of the sliding sleeve 60 and hence rotationally fixed. In the open position illustrated in FIG. 7, there is no engagement between the inner profiling 61 of the sliding sleeve 60 and the outer profiling 63' of the output shaft 14" so that in this position the clutch 11' is open and the coupling between the shaft 12' and the output shaft 14" is eliminated. Preferably a catch device (not illustrated) is provided to hold the sliding sleeve 60 in the closed position after activation of the clutch 11'.

As is evident from FIG. 7, the inner profiling 61 of the sliding sleeve 60 and outer profiling 63, 63' of the shafts 12', 14" each have on their face cap-like chamfers 64 to facilitate the engagement process. In particular, at low differential rotational speeds between the shaft 12' and the output shaft 14", in this way additional synchronization measures can be omitted. Depending on requirement however a spring accumulator acting between the sliding sleeves 60 and the output shaft 14" can be provided to prevent damage to components of the actuator device 16' in a "tooth on tooth" position. The sliding sleeve 60 is shifted in the axial direction from the open position to the closed position and vice versa by means of two lifting magnets 32, 52 as will be described in more detail below.

On the cylindrical outside of the sliding sleeve 60 are provided two helically running grooves, namely a first groove 65 with a right-hand twist and a second groove 67 with a left-hand twist. The two grooves 65, 67 are designed such that the respective tappet 34 of the lifting magnets 32, 52 can come directly into a sliding engagement with the grooves 65, 67. The grooves 65, 67 and the tappet 34 thus cooperate in the sense of a sliding block guide, whereby because of the helical course of the grooves 65, 67, a thread arrangement is formed in which the grooves 65, 67 form a threaded segment and the tappets 34 form an engagement segment. On movement of the tappet 34 of the lifting magnet 32 into its radially extended end position, in the course of rotation of the sliding sleeve 60 said tappet comes into engagement with the first groove 65, and because it is itself axially stationary and stops the rotation of the sliding sleeve 60 causes an axial movement of the sliding sleeve 60 into the closed position illustrated on the right in FIG. 7.

To prevent further shifting of the sliding sleeve 60 beyond the closed position, either the thread formed by the first helically running groove 65 can run out accordingly or the tappet 34 can be moved back into its radially retracted end position as soon as the closed position is reached. To this end the momentary axial position of the sliding sleeve 60 can be detected by means of a sensor or determined by a computer model in a control device. In principle, the lifting magnet 32 activated for operation can remain under power until the next activation process.

To shift the sliding sleeve 60 from the closed position into the open position illustrated in FIG. 7, the lifting magnet 52 allocated to the second groove 67 is activated so that its tappet 34 comes into engagement with the second groove 67 and causes an axial shift of the sliding sleeve 60 in the opening direction in the same way as described above. To facilitate tracking of the tappet 34 in the grooves 65, 67 of the rotating sliding sleeve 60, both the grooves 65, 67 have a ramp-like starting segment 69 and a ramp-like end segment 70.

If a relatively rapid activation of the clutch 11' is required, the grooves 65, 67 can be formed correspondingly short. In particular they can extend over less than 360°.

Figure 8:
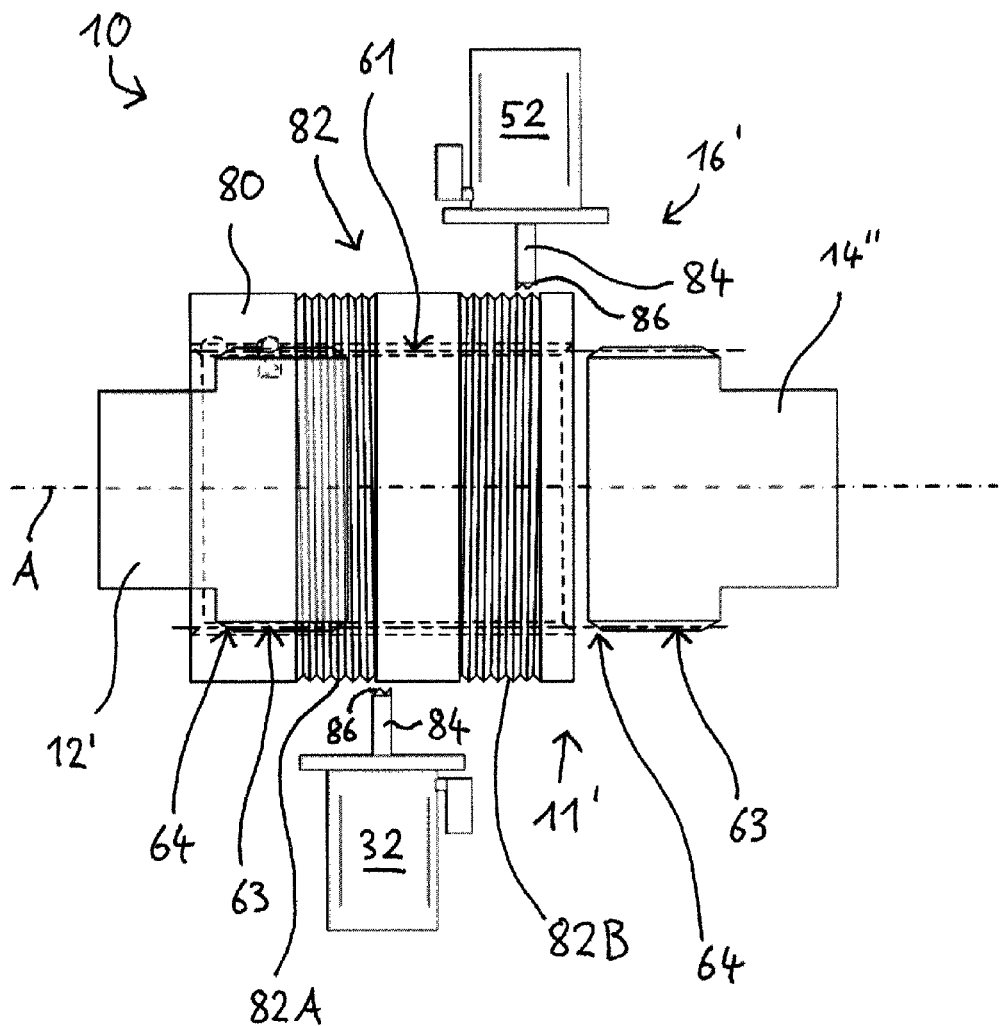
FIG. 8 illustrates a simplified side view of a coupling arrangement in accordance with a fourth embodiment of the invention.

FIG. 8 illustrates a fourth embodiment of the invention, the clutch 11' comprising a sliding sleeve 80 with an external thread 82 which is divided into a right-hand thread 82A and a separate left-hand thread 82B. As in the second and third embodiments, two lifting magnets 32, 52 are provided, wherein one of the lifting magnets 32, 52 is allocated to the right-hand thread 82A and the other lifting magnet 52 to the left-hand thread 82B. On the face of each tappet 84 of the lifting magnets 32, 52 is formed an internal thread 86 which fits the external thread 82. On activation of the respective lifting magnet 32, 52 and corresponding extension of the tappet 84, the internal thread 86 on its face comes into engagement with the outer thread 82 of the sliding sleeve 80 and in the same way as the arrangement of groove and tappet according to the third embodiment (FIG. 7), causes an axial shift of the sliding sleeve 80 in the closing direction or in the opening direction. Depending on whether opening or closing of the clutch 11' is required, the lower lifting magnet 32 or the upper lifting magnet 52 in FIG. 8 is activated.

LIST OF REFERENCE NUMERALS

10 Coupling arrangement
11,11' Clutch
12, 12' Rotating shaft
14, 14', 14" Output shaft
16, 16' Activation device
18 Actuator element
22, 22' Selector fork
23 Sleeve
24 Lever
26 Carrier
28 Nut angle segment
30 Threaded segment
32 Lifting magnet
34 Tappet
36 First spring element
38 Second spring element
39 Back
40 Additional threaded segment
42 Additional lever
44 Additional nut angle segment
46 Additional carrier
52 Additional lifting magnet
54 Third spring element
60 Sliding sleeve
61 Inner profiling
63, 63' Outer profiling
64 Chamfer
65 Right-hand twist groove
67 Left-hand twist groove
69 Ramp-like starting segment
70 Ramp-like end segment
80 Sliding sleeve
82 External thread
82A Right-hand thread
82B Left-hand thread
84 Tappet
86 Internal thread
A Rotation axis
S Pivot axis

What is claimed is:
1. A coupling arrangement for a drive train of a motor vehicle, the coupling arrangement comprising:
  a shaft configured for rotation;
  a clutch arranged on the shaft and configured to couple the rotating shaft selectively with a drive element of the drive train;
  an activation device configured to open the clutch, wherein the activation device is configured to bring an engagement segment selectively into engagement with a threaded segment rotating with the shaft in order to cause a relative movement of the engagement segment and the threaded segment along the axis of the shaft to thereby activate the clutch in the axial direction,
  wherein the engagement segment is formed by a segment of one of an axially displaceable actuator element of the activation device and a radially mobile tappet of the activation device.
2. The coupling arrangement of claim 1, wherein the threaded segment is formed by a segment of one of the shaft and a sleeve connected rotationally stationary with the shaft.

3. The coupling arrangement of claim 1, wherein the engagement segment is mobile in the radial direction in relation to the axis of the shaft.

4. The coupling arrangement of claim 1, wherein:
the activation device comprises an actuator configured to move the engagement segment relative to the threaded segment and thereby selectively bring the engagement segment into engagement with the threaded segment; and
the actuator comprises a magnet, or a linear motor.

5. The coupling arrangement of claim 1, wherein the drive element of the drive train is one of a second shaft and a gear element.

6. The coupling arrangement of claim 1, wherein the threaded segment comprises:
a first threaded segment portion having a plurality of threads oriented in a first direction; and
a second threaded segment portion having a plurality of threads oriented in a second direction opposite to the first direction.

7. The coupling arrangement of claim 1, wherein:
the activation device comprises an actuator element having a carrier upon which is formed the engagement segment; and
the threaded segment is formed on the shaft in a manner such that in order to open the clutch, the actuator element is displaceable along the axis of the rotating shaft via the threaded segment.

8. The coupling arrangement of claim 1, wherein:
the activation device comprises an actuator element having a carrier upon which is formed the engagement segment and an actuator configured to prevent a return movement of the actuator element in axial direction in relation to the axis of the shaft; and
the threaded segment is formed on the shaft in a manner such that in order to open the clutch, the actuator element is displaceable along the axis of the rotating shaft via the threaded segment.

9. The coupling arrangement of claim 1, wherein:
the activation device comprises an actuator element having a carrier upon which is formed the engagement segment;
the threaded segment is formed on the rotating shaft in a manner such that in order to open the clutch, the actuator element is displaceable along the axis of the shaft via the threaded segment; and
a spring device is configured to apply a pretension force to the carrier in one of a radially outward and radially inward direction in relation to the axis of the shaft.

10. The coupling arrangement of claim 1, wherein:
the activation device comprises an actuator element having a carrier upon which is formed the engagement segment;
the threaded segment is formed on the rotating shaft in a manner such that in order to open and close the clutch, the actuator element is displaceable along the axis of the shaft via the threaded segment; and
a spring device is configured to apply a pretension force to the actuator element in an axial direction in relation to the axis of the shaft.

11. The coupling arrangement of claim 1, wherein:
the activation device comprises an actuator element having a carrier upon which is formed the engagement segment;
the threaded segment is formed on the rotating shaft in a manner such that in order to open the clutch, the actuator element is displaceable along the axis of the shaft via the threaded segment;
a lever is pivotably mounted on an axially displaceable component of the actuator element; and
the lever includes the carrier.

12. The coupling arrangement of claim 1, wherein:
the activation device comprises an actuator element having a carrier upon which is formed the engagement segment;
the threaded segment is formed on the rotating shaft in a manner such that in order to open the clutch, the actuator element is displaceable along the axis of the shaft via the threaded segment;
the threaded segment of the shaft has an external thread; and
the engagement segment of the carrier has an internal thread which corresponds to the external thread.

13. A coupling arrangement for a drive train of a motor vehicle, the coupling arrangement comprising:
a shaft;
a clutch arranged on the shaft to selectively couple the shaft with a drive element of the drive train;
an activation device to open the clutch and selectively bring an engagement segment into engagement with a threaded segment rotating with the shaft in order to cause a relative movement of the engagement segment and the threaded segment along the axis of the shaft to thereby open the clutch,
wherein:
the threaded segment is formed by a portion of a sleeve connected rotationally fixed with the shaft and axially displaceable, to thereby to create a form-fit connection between the shaft and the drive element of the drive train; and
an external thread is provided on the sleeve and forms the threaded segment which cooperates with an internal thread forming the engagement segment on an axially fixed part of the activation device.

14. The coupling arrangement of claim 13, wherein the internal thread is formed on:
a face of a radially mobile tappet of an actuator; or
an engagement element on which can operate the radially mobile tappet of the actuator.

15. The coupling arrangement of claim 13, wherein the threaded segment is formed by a groove which runs helically and is adapted for engagement with an actuator pin which forms the engagement segment.

16. The coupling arrangement of claim 15, wherein the actuator pin is formed by a radially mobile tappet of an actuator.

17. The coupling arrangement of claim 15, wherein the groove has at least one of a ramp-like starting segment and a ramp-like end segment.

18. The coupling arrangement of claim 15, wherein the sleeve is configured for locking in an axial end position.

19. A coupling arrangement for a drive train of a motor vehicle, the coupling arrangement comprising:
a shaft configured for rotation;
a clutch on the shaft and which is configured to couple the rotating shaft selectively with a drive element of the drive train;
an activation device configured to open the clutch, wherein the activation device is configured to bring an engagement segment selectively into engagement with a threaded segment rotating with the shaft in order to cause a relative movement of the engagement segment and the threaded segment along the axis of the shaft to thereby open the clutch, wherein:
- the activation device comprises an actuator element having a carrier upon which is formed the engagement segment;
- the threaded segment is formed on the rotating shaft in a manner such that in order to open the clutch, the actuator element is displaceable along the axis of the shaft via the threaded segment; and
- the engagement segment of the carrier is configured for engagement with the threaded segment along a length of the threaded segment which corresponds to an axial adjustment distance of the actuator element.

* * * * *